(12) United States Patent
Minakata (10) Patent No.: US 9,965,709 B2
(45) Date of Patent: May 8, 2018

(54) NON-TRANSITORY COMPUTER READABLE RECORDING MEDIUM THAT RECORDS A PROGRAM FOR CAUSING A COMPUTER OF AN INFORMATION PROCESSING APPARATUS TO GENERATE PRINTABLE DATA UTILIZING CACHED COMMANDS, AND INFORMATION PROCESSING APPARATUS THAT GENERATES PRINTABLE DATA

(71) Applicant: KYOCERA DOCUMENT SOLUTIONS INC., Osaka (JP)

(72) Inventor: Yoshinori Minakata, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/289,492

(22) Filed: Oct. 10, 2016

(65) Prior Publication Data

US 2017/0109616 A1    Apr. 20, 2017

(30) Foreign Application Priority Data

Oct. 20, 2015 (JP) ................................ 2015-205992

(51) Int. Cl.
*G06K 15/00* (2006.01)
*G06F 3/00* (2006.01)
(Continued)

(52) U.S. Cl.
CPC ..... *G06K 15/1884* (2013.01); *G06K 15/1809* (2013.01); *G06K 15/1817* (2013.01); *H04N 1/00204* (2013.01); *H04N 2201/0094* (2013.01)

(58) Field of Classification Search
None
See application file for complete search history.

(56) References Cited

U.S. PATENT DOCUMENTS

2004/0213432 A1   10/2004   Kadota
2010/0134844 A1    6/2010   Ito
(Continued)

FOREIGN PATENT DOCUMENTS

JP    1995-172022 A    7/1995
JP    2001-199105 A    7/2001
(Continued)

*Primary Examiner* — Barbara Reinier
(74) *Attorney, Agent, or Firm* — Li & Cai Intellectual Property (USA) Office (57) ABSTRACT

A non-transitory computer readable recording medium recording a program for causing an information processing apparatus to function as: a control circuit that determines whether a rendering command of a document created using presentation software is a first-page rendering command, when determined as the first-page rendering command, caches it, generates first-page printable data based on the first-page rendering command and caches it, and when determined as a rendering command of one of second and subsequent pages, determines whether at least parts thereof and the first-page rendering command are in common, and generates, when determined that at least parts thereof and the first-page rendering command are in common, printable data of the one of second and subsequent pages using the first-page printable data; and a communication interface that transmits the printable data to an image forming apparatus.

5 Claims, 5 Drawing Sheets

(51) Int. Cl.
*G06K 15/02* (2006.01)
*H04N 1/00* (2006.01)

(56) References Cited

U.S. PATENT DOCUMENTS

| 2012/0057198 | A1 | 3/2012 | Yabe | |
| 2013/0258378 | A1* | 10/2013 | Isoguchi | G06K 15/1813 358/1.13 |
| 2015/0262046 | A1* | 9/2015 | Hayakawa | G06F 3/12 358/3.24 |

FOREIGN PATENT DOCUMENTS

| JP | 2001-325081 A | 11/2001 |
| JP | 2004-328486 A | 11/2004 |
| JP | 2010-128941 A | 6/2010 |
| JP | 2012-056179 A | 3/2012 |

* cited by examiner

NON-TRANSITORY COMPUTER READABLE RECORDING MEDIUM THAT RECORDS A PROGRAM FOR CAUSING A COMPUTER OF AN INFORMATION PROCESSING APPARATUS TO GENERATE PRINTABLE DATA UTILIZING CACHED COMMANDS, AND INFORMATION PROCESSING APPARATUS THAT GENERATES PRINTABLE DATA

INCORPORATION BY REFERENCE

This application claims the benefit of Japanese Priority Patent Application JP 2015-205992 filed Oct. 20, 2015, the entire contents of which are incorporated herein by reference.

FIELD

The present disclosure relates to an information processing apparatus capable of causing an image forming apparatus to form images of a document created using presentation software and a non-transitory computer readable recording medium that records a program therefor.

BACKGROUND

The information processing apparatus is capable of causing the image forming apparatus to form images of a document created using presentation software.

SUMMARY

It is desirable to raise an image forming speed of a document in which a plurality of pages include a common part.

A non-transitory computer readable recording medium according to an embodiment of the present disclosure records a program for causing a computer of an information processing apparatus to operate as:
  a control circuit that
    determines whether a rendering command of a document created using presentation software is a first-page rendering command,
    when determined as the first-page rendering command, caches the first-page rendering command, and
    generates first-page printable data based on the first-page rendering command and caches the first-page printable data, and
    when determined as a rendering command of one of second and subsequent pages,
    determines whether the rendering command of the one of second and subsequent pages and the cached first-page rendering command are in common in at least parts thereof, and
    generates, when determined that the rendering command of the one of second and subsequent pages and the cached first-page rendering command are in common in at least parts thereof, printable data of the one of second and subsequent pages using the cached first-page printable data; and
  a communication interface that transmits the printable data generated by the control circuit to an image forming apparatus.

An information processing apparatus according to an embodiment of the present disclosure includes:
  a control circuit that
    determines whether a rendering command of a document created using presentation software is a first-page rendering command,
    when determined as the first-page rendering command, caches the first-page rendering command, and
    generates first-page printable data based on the first-page rendering command and caches the first-page printable data, and
    when determined as a rendering command of one of second and subsequent pages,
    determines whether the rendering command of the one of second and subsequent pages and the cached first-page rendering command are in common in at least parts thereof, and
    generates, when determined that the rendering command of the one of second and subsequent pages and the cached first-page rendering command are in common in at least parts thereof, printable data of the one of second and subsequent pages using the cached first-page printable data; and
  a communication interface that transmits the printable data generated by the control circuit to an image forming apparatus.

DETAILED DESCRIPTION

Hereinafter, an embodiment of the present disclosure will be described with reference to the drawings.

(1. General Outline of Image Forming System)

Figure 1:
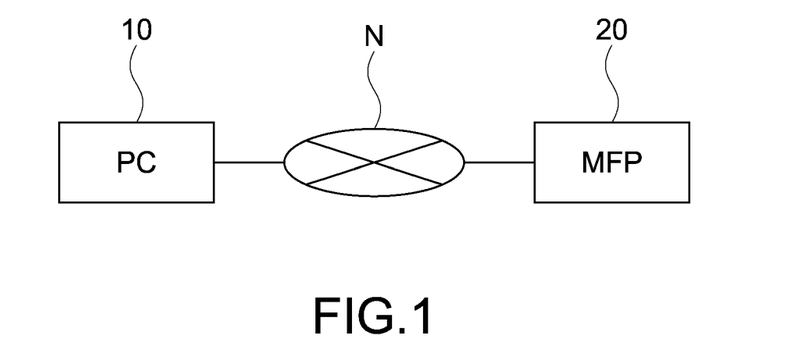
FIG. 1 shows an image forming system according to an embodiment of the present disclosure.

FIG. 1 shows an image forming system according to an embodiment of the present disclosure.

The image forming system 1 includes an information processing apparatus 10 and an image forming apparatus 20.

The information processing apparatus 10 is typically a PC (Personal Computer) and will be described as "PC 10" hereinafter. The PC 10 creates printable data using software such as presentation software (e.g., POWERPOINT (registered trademark)). The PC 10 transmits the created printable data to the image forming apparatus 20 via a network N. In other words, the information processing apparatus 10 assumes a role as a host computer with respect to the image forming apparatus 20. The network N is, for example, a LAN (Local Area Network).

The image forming apparatus 20 is typically an MFP (Multifunction Peripheral) and will be described as "MFP 20" hereinafter. The MFP 20 receives the printable data from the PC 10 via the network N. The MFP 20 carries out image forming processing on the received printable data.

(2. Hardware Configuration of Information Processing Apparatus)

Figure 2:
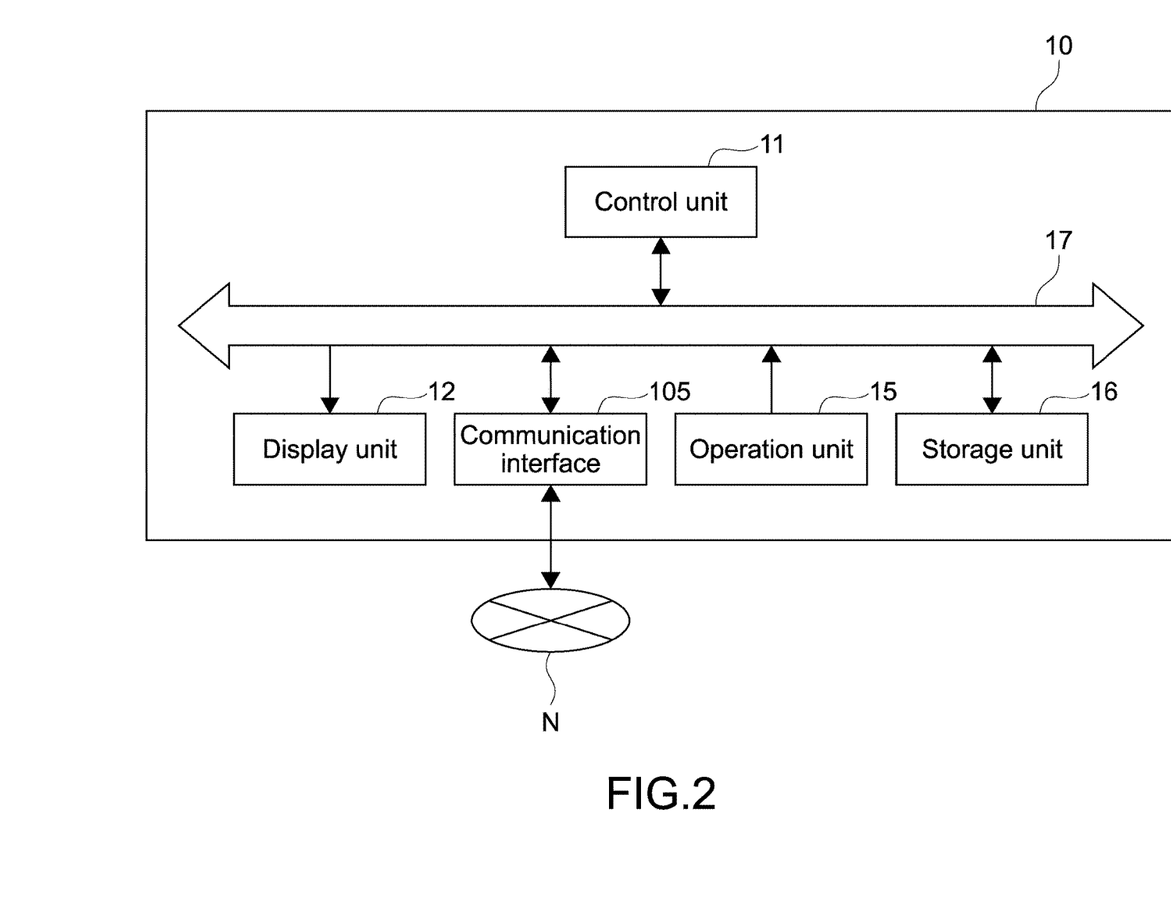
FIG. 2 shows a hardware configuration of an information processing apparatus.

FIG. 2 shows a hardware configuration of the information processing apparatus.

The PC 10 includes a control unit 11 and a display unit 12, a communication interface 105, an operation unit 15, and a storage unit 16 that are connected to the control unit 11 via a bus 17.

The control unit 11 includes a CPU (Central Processing Unit) and the like. The control unit 11 executes programs loaded to a RAM (Random Access Memory). A computer program that causes the control unit 11 of the PC 10 to operate as the respective units (to be described later) is stored in a non-transitory computer readable recording medium such as a ROM.

The storage unit 16 includes a large-capacity storage apparatus such as a ROM (Read Only Memory), a RAM, and an HDD (Hard Disk Drive). The ROM fixedly stores programs to be executed by the control unit 11, data, and the like. The programs stored in the ROM are loaded to the RAM. The large-capacity storage apparatus stores a database.

The display unit 12 includes an LCD (Liquid Crystal Display), an organic EL (Electroluminescence) display, and the like. The display unit 12 carries out operational processing based on information received from the control unit 11 and displays generated image signals on a screen. Typically, the display unit 12 is an external display apparatus.

The operation unit 15 includes a keyboard, a mouse, and various switches. The operation unit 15 detects user operations and outputs operation signals to the control unit 11.

The communication interface 105 is an interface used for connecting to the network N.

(3. Hardware Configuration of Image Forming Apparatus)

Figure 3:
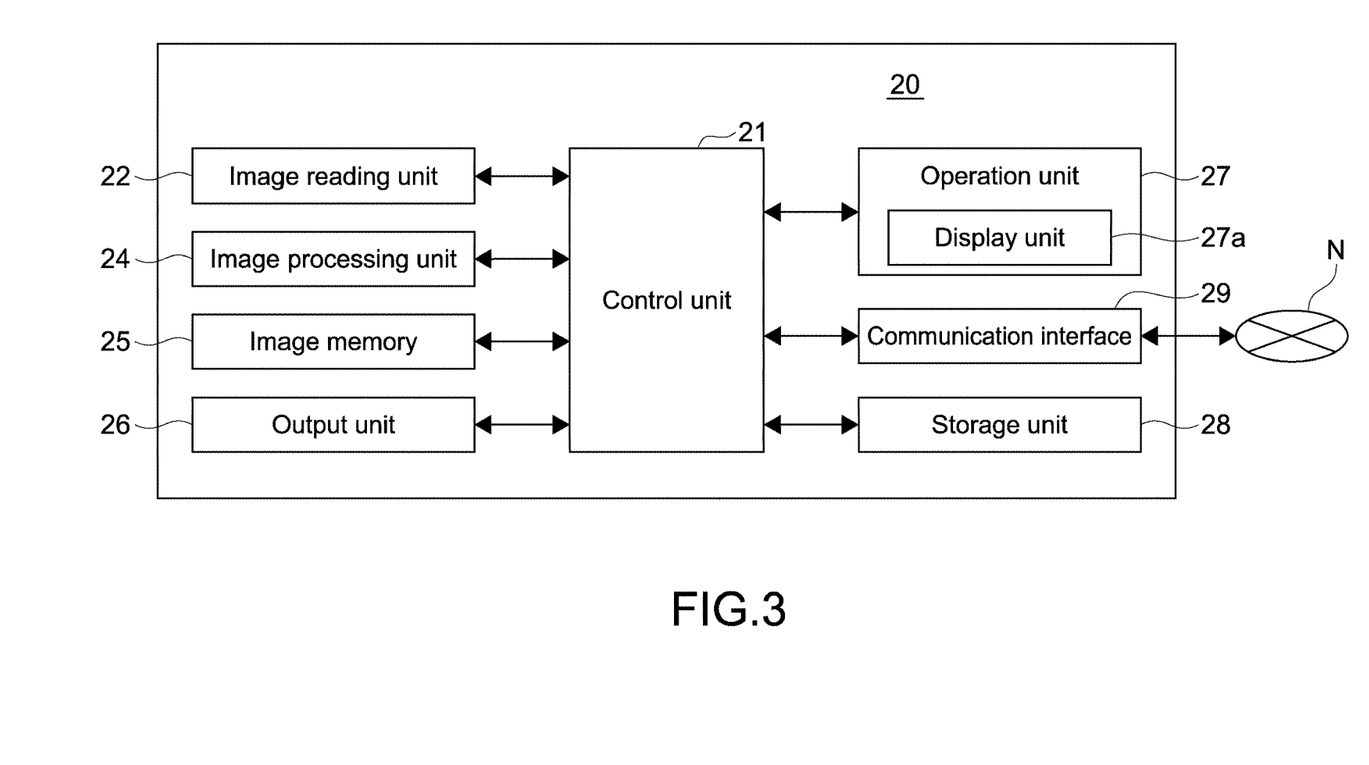
FIG. 3 shows a hardware configuration of an image forming apparatus.

FIG. 3 shows a hardware configuration of the image forming apparatus.

The MFP 20 includes a control unit 21. The control unit 21 is constituted of a CPU, a RAM, a ROM, dedicated hardware circuits, and the like and performs overall operational control of the MFP 20.

The control unit 21 is connected to an image reading unit 22, an image processing unit 24, an image memory 25, an output unit 26, an operation unit 27, a communication interface 29, a storage unit 28, and the like. The control unit 21 controls operations of the respective units connected thereto and exchanges signals and data with those units.

The control unit 21 controls, according to job execution instructions input by a user via the operation unit 27, the PC 10 connected to the network, and the like, drive and processing of a mechanism requisite for executing operational control of the functions including a scanner function, a printing function, a copy function, and a facsimile exchange function.

The image reading unit 22 is a scanner that reads an image from a script.

The image processing unit 24 is an image processing processor that processes image data of an image read by the image reading unit 22 as necessary. For example, the image processing unit 24 carries out image processing such as shading correction for improving image quality of an image formed based on the image read by the image reading unit 22.

The image memory 25 includes an area for temporarily storing data of a script image read by the image reading unit 22 and temporarily storing data to be printed, that has been received via the communication interface 29.

The output unit 26 forms an image based on the image data read by the image reading unit 22 and the like and outputs the image.

The operation unit 27 includes a touch panel unit and an operation key unit that accept user instructions on various operations and processing executable by the MFP 20. The touch panel unit includes a display unit 27a such as an LCD (Liquid Crystal Display) that is provided with a touch panel.

The communication interface 29 is an interface used for connecting to the network N.

The storage unit 28 is a large-capacity storage apparatus such as an HDD, that includes an area for storing script images read by the image reading unit 22 and the like.

(4. Configuration of Information Processing Apparatus)

Figure 4:
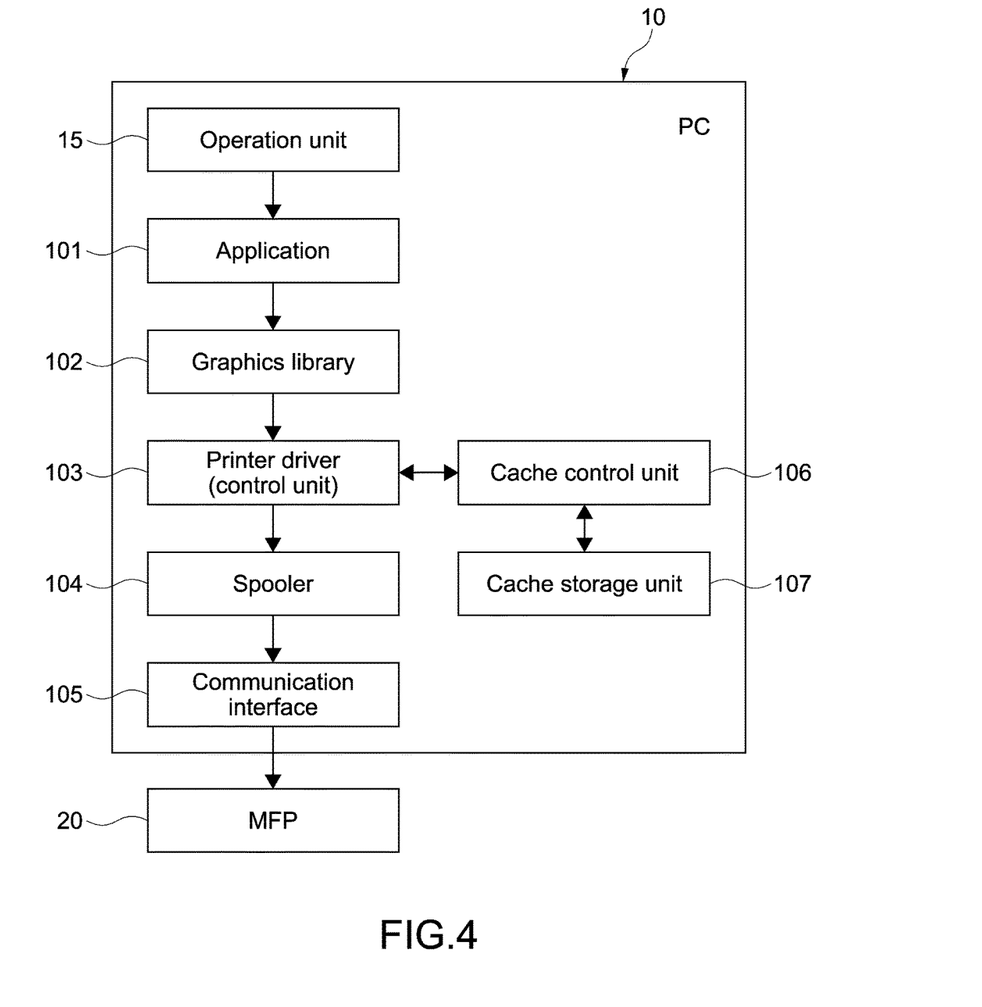
FIG. 4 shows a configuration of the information processing apparatus.

FIG. 4 shows a configuration of the information processing apparatus.

The control unit 11 of the PC 10 loads an information processing program recorded onto the ROM as an example of the non-transitory computer readable recording medium to the RAM and executes the program to operate as an application 101, a graphics library 102, a printer driver 103 (control unit), a spooler 104, the communication interface 105, a cache control unit 106, and a cache storage unit 107.

The application 101 is an application program executed on the PC 10, such as presentation software, word processor software, and spreadsheet software.

The graphics library 102 is a graphics-related module supported by an OS (Operating System) of the PC 10.

The printer driver 103 converts a first rendering command acquired from the graphics library 102 into a second rendering command for the MFP 20 and creates printable data. It should be noted that in this embodiment, the functional block formed by the control unit 11 executing the printer driver (program) is referred to as "printer driver 103".

The spooler 104 temporarily stores printable data generated by the printer driver 103 in the HDD of the storage unit 16 or the like and successively transmits the data to the MFP 20. It should be noted that the control unit 11 operates as the spooler 104 by executing an execution file for spooling the printable data.

The communication interface 105 communicates with the MFP 20, other host computers (not shown), and the like.

The cache control unit 106 controls caches of a first rendering command that the printer driver 103 has acquired from the graphics library 102 (application data before being converted) and a second rendering command for the MFP 20, that has been created by the printer driver 103 (printable data after conversion).

The cache storage unit 107 stores the caches of the first rendering command that the printer driver 103 has acquired from the graphics library 102 (application data before being converted) and the second rendering command for the MFP 20, that has been created by the printer driver 103 (printable data after conversion).

The control unit 21 executes programs so as to operate as the cache control unit 106 and the cache storage unit 107.

(5. Operations of Information Processing Apparatus)

Figure 5:
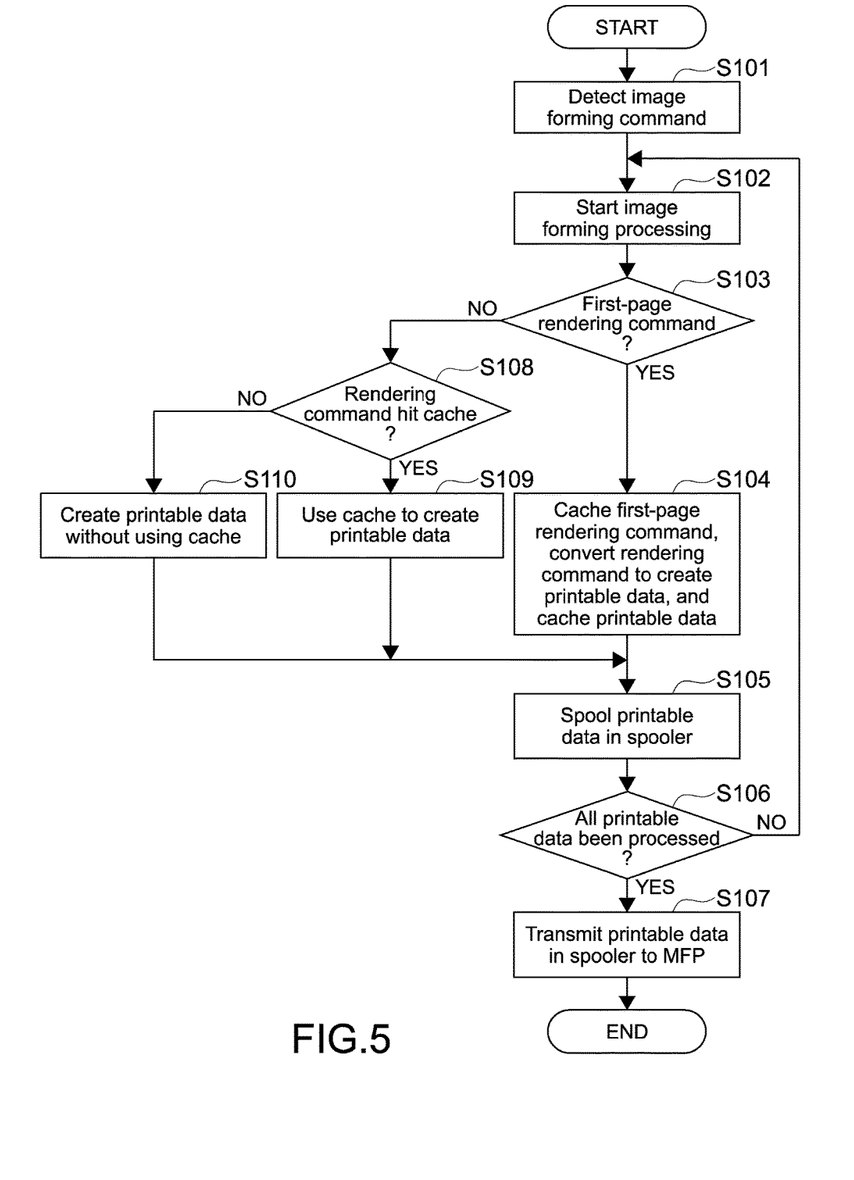
FIG. 5 shows operations of the information processing apparatus.

FIG. 5 shows operations of the information processing apparatus.

(Step S101)

The application 101 detects a specific user operation with respect to the operation unit 15 as an image forming command.

(Step S102)

Upon detecting the image forming command, the application 101 starts image forming processing using the graphics library 102. The graphics library 102 supplies first rendering command to the printer driver 103.

(Step S103)

The printer driver 103 acquires the first rendering command from the graphics library 102. Referring to the first rendering command acquired from the graphics library 102, the printer driver 103 determines whether the first rendering command is related to the first page of a document that has been created using presentation software.

It should be noted that the printer driver 103 may determine whether the document is created using presentation software using either one of the following examples (1) and (2), for example.

(1) The printer driver 103 is a type of dynamic link library and coupled to a process of the application 101. The printer driver 103 acquires an application software name based on information on that process.

(2) Upon starting the image forming processing, the application 101 notifies the printer driver 103 of the information of the image forming job (including application software name). The printer driver 103 reads out the application software name from the acquired information of the image forming job.

Meanwhile, the storage unit 16 (FIG. 2) stores, as a table (not shown), identification information that uniquely identifies application software (application software name) and a type of the application software (presentation software, spreadsheet software, word processor software, etc.). The printer driver 103 references the table and determines the type of application software identified by the acquired application software name.

(Step S104)

Referring back to the flow, upon determining that the first rendering command is related to the first page (YES in Step S103), the printer driver 103 converts the first rendering command acquired from the graphics library 102 into a second rendering command for the MFP 20 to create printable data. At this time, the printer driver 103 stores, in the cache storage unit 107 via the cache control unit 106, data not yet converted (first rendering command from graphics library 102, that is, first-page rendering command) and the converted data (printable data for MFP 20, that is, first-page printable data) in association with a specific cache ID. In other words, regarding the first page, the cache ID, the first rendering command, and the printable data are stored in the cache storage unit 107 in association with one another.

(Step S108)

On the other hand, the printer driver 103 determines that the first rendering command is of any one of second and subsequent pages (second page in this example) (NO in Step S103). In this case, the printer driver 103 makes an inquiry to the cache control unit 106 as to whether at least a part of the first rendering command acquired from the graphics library 102 (i.e., first rendering command for second page) is cached in the cache storage unit 107 (performs cache hit check of first rendering command).

It should be noted that when at least a part of the first rendering command for the second page is cached in the cache storage unit 107 (hit cache of first rendering command), in this example, the cache control unit 106 can determine that the first rendering command for the second page, for which the inquiry has been made by the printer driver 103, and the first rendering command for the first page, that is cached in the cache storage unit 107, are in common in at least parts thereof.

The cache control unit 106 compares the first rendering command for the second page, for which the inquiry has been made by the printer driver 103, with the cache of the first-page rendering command stored in the cache storage unit 107. The cache control unit 106 supplies the comparison result to the printer driver 103. Specifically, the comparison result is supplied as follows.

When at least a part of the first rendering command for the second page is cached in the cache storage unit 107 (hit cache of first rendering command), the cache control unit 106 supplies the cache ID associated with the hit cache to the printer driver 103 as a comparison result (YES in Step S108). The cache control unit 106 clears a cache corresponding to uncommon parts between the first rendering command of the first page and the first rendering command of the second page (typically, other than background) that is stored in the cache storage unit 107 (i.e., deletes, from cache storage unit 107, cache (first rendering command and printable data) corresponding to cache ID of first rendering command, that is not in common with inquired second page). As a result, a common part (typically, background) between the printable data of the first page and that of the second page remains in the cache storage unit 107.

When at least a part of the first rendering command for the second page is not cached in the cache storage unit 107 (does not hit cache of first rendering command), the cache control unit 106 supplies a notification that notifies "no cache", for example, to the printer driver 103 as the comparison result (NO in Step S108). When not hitting the cache of the first rendering command, the cache control unit 106 clears all caches of printable data of the first page that are stored in the cache storage unit 107 (i.e., deletes all first rendering command and printable data of first page from cache storage unit 107).

(Step S109)

When the cache ID is acquired from the cache control unit 106, the printer driver 103 determines that the first rendering command for the second page and the first rendering command for the first page, which are cached in the cache storage unit 107, are in common in at least parts thereof. In this case, the printer driver 103 retrieves printable data associated with the cache ID (i.e., common part of first-page printable data and second-page printable data (typically, background)) from the cache storage unit 107 via the cache control unit 106.

The printer driver 103 also creates printable data according to the first rendering command acquired from the graphics library 102. It should be noted that here, the printable data newly created by the printer driver 103 without using a cache ID is printable data on the uncommon parts between the first rendering command for the first page and the first rendering command for the second page (typically, other than background).

In short, the printer driver 103 uses the cached first-page printable data as it is for the part common with the first page (typically, background), newly generates printable data only for the uncommon parts, and synthesizes the printable data of the common part and the printable data of the uncommon parts, to generate second-page printable data.

(Step S110)

On the other hand, upon acquiring the notification "no cache" from the cache control unit 106, the printer driver 103 determines that the first rendering command for the second page is not at all in common with any part of the first rendering command for the first page, that is cached in the cache storage unit 107. In this case, the printer driver 103 converts the first-page rendering command acquired from the graphics library 102 into a second rendering command for the MFP 20 and generates printable data. In other words, the printer driver 103 creates printable data without using a cache.

(Step S105)

The printer driver 103 spools the created (Step S104, S109, or S110) printable data in the spooler 104.

(Step S106)

The printer driver 103 determines whether all the printable data have been processed. When determining that all the printable data have been processed (YES in Step S106), the printer driver 103 notifies the spooler 104 to that effect.

(Step S107)

Upon acquiring the notification that all the printable data have been processed from the printer driver 103 (YES in Step S106), the spooler 104 successively transmits the created printable data to the MFP 20 via the communication interface 105.

(6. Conclusion)

In documents that have been created using presentation software (e.g., POWERPOINT (registered trademark)), it is generally the case that documents in a plurality of pages have a common part in at least parts thereof. Specifically, of the plurality of pages, a background or a partial component is common throughout all the pages, and texts and the like differ for each page in general.

According to this embodiment, when determining that the first rendering command is the first rendering command for the first page (YES in Step S103), the printer driver 103 caches the first rendering command for the first page, generates first-page printable data based on the first rendering command for the first page, and caches the first-page printable data (Step S104). When determining that the first rendering command is the first rendering command for second and subsequent pages (NO in Step S103), the printer driver 103 determines whether the first rendering command for the second and subsequent pages and the cached first rendering command for the first page are in common in at least parts thereof (Step S108), and generates, when determining that at least parts thereof are in common (YES in Step S108), printable data of the second and subsequent pages using the cached first-page printable data (Step S109).

In short, in the second and subsequent pages (excluding first page), a cache hit check of the first rendering command is performed against the first rendering command for the first page, and when hitting the cache of the first rendering command, the printer driver 103 generates printable data of the second and subsequent pages using the first-page printable data. As a result, printable data of a part common with the first page (specifically, background etc.) does not need to be created one by one each time for the second and subsequent pages. Consequently, according to this embodiment, as compared to a typical image forming method (even when background image is in common throughout all pages, printable data of all pages are created one by one according to first rendering commands of those pages), high-speed printable data generation processing can be realized. In other words, by carrying out the processing of generating printable data of second and subsequent pages using the cache of the first-page printable data, the time required for generating the printable data of the second and subsequent pages can be shortened, with the result that the printable data generation processing speed is raised.

(7. Modified Examples)

In Step S109, the printer driver 103 may add a form or macro command using a function of PDL (Page Description Language) after the conversion. Specifically, upon determining that the first rendering command for the second page and the cached first rendering command for the first page are in common in at least parts thereof, the printer driver 103 describes printable data corresponding to the common part in a form or macro command. Then, the printer driver 103 notifies the cache control unit 106 that the form or macro command has been added. Upon being notified, the cache control unit 106 appropriately updates the cache using the form or macro command. As a result, since the MFP 20 can invoke the form or macro, the image forming speed of the MFP 20 is raised.

In this embodiment, the processing carried out when acquiring first rendering commands for pages excluding the first page (for second and subsequent pages) are not differentiated. In other words, the processing of the first rendering command for the second page and that of the first rendering commands for third and subsequent pages are not differentiated. However, those may specifically be differentiated as follows.

When the first rendering command is a first rendering command for a second page, the printer driver 103 determines that the first rendering command for the second page and the cached first rendering command for the first page are in common in at least parts thereof (hit cache of first rendering command). In this case, the printer driver 103 may determine whether a rendering command for a third page and the cached first rendering command for the first page are in common in at least parts thereof using a method simpler than that used for determining whether the first rendering command for the second page and the cached first rendering command for the first page are in common in at least parts thereof. Examples of the simpler method are as follows.

(1) The printer driver 103 stores a data size of a consecutive common part (background) of cache hit against the second page. In the cache hit check of the first rendering command for a third page, upon acquiring a cache ID from the cache control unit 106 and detecting a start of the common part (background), the printer driver 103 starts counting the data size from that point as a start point and detects an end point of a data group having the data size. While counting the data size, the printer driver 103 does not inquire the cache control unit 106 as to whether at least a part of the first rendering command for the third page is cached. The printer driver 103 inquires the cache control unit 106 as to whether at least a part of the first rendering command near the end point is cached. In other words, the printer driver 103 performs the cache hit check only at the start and end points of the common part (background), and the cache hit check of an intermediate part is omitted. As in the embodiment above, the printer driver 103 acquires a cache ID corresponding to the first rendering command of the start and end points of the common part from the cache control unit 106. Further, the printer driver 103 requests the cache control unit 106 to supply a cache ID corresponding to the first rendering command from the start point to the end point of the common part. The printer driver 103 acquires the cache ID supplied in response to this request.

Accordingly, the printer driver 103 determines that, in the third page of a document, the rendering command of the start and end points of the common part and the first rendering command between the start point and the end point are in common with the first rendering command for the first page, that is cached in the cache storage unit 107.

(2) The printer driver 103 stores a data size of a consecutive common part (background) of a cache hit in the second page. In the cache hit check of the first rendering command for the third page, upon acquiring a cache ID from the cache control unit 106 and detecting a start of the common part (background), the printer driver 103 starts counting the data size from that point as a start point and intermittently (while thinning) performs the hit check for the data size (inquires cache control unit 106 as to whether first rendering command is cached). In other words, the printer driver 103 intermittently (while thinning) performs the hit check of the common part (background), or to put it the other way around, intermittently omits the hit check. As in the embodiment above, the printer driver 103 acquires a cache ID corresponding to the first rendering command of the hit-checked position including the start point of the common part from the cache control unit 106. The printer driver 103 also requests the cache control unit 106 to supply a cache ID corresponding to the first rendering command of the hitcheck-omitted position out of the common part. The printer driver 103 acquires the cache ID supplied in response to this request.

Accordingly, the printer driver 103 determines that parts of the first rendering command of the hit-checked positions including the start point of the common part and the hit-check-omitted positions of the third page of the document are in common with parts of the first rendering command for the first page, that is cached in the cache storage unit 107.

It should be noted that in the example (2) above, the hit check may be performed on the end point of the common part as in the example (1) above.

In the examples (1) and (2) above, printable data of fourth and subsequent pages are processed similar to the third page.

According to the examples (1) and (2) above, when the cache of the first rendering command of the second page is hit, the common part (background) between the second page and the first page is specified. Therefore, for the third and subsequent pages, as long as the hit check is performed against at least a part of the common part (background), the common part (background) of the third and subsequent pages can be specified relatively accurately and at higher speed.

While the embodiment and modified examples above describe the pages as the "first page", "second page", and "third page", those may be values in a strict sense. Alternatively, values obtained by counting a front cover as "page 0" and a page subsequent to the front cover as the "first page" (strictly "second page" when front cover is assumed to be "first page") may be used. In presentation software, there are cases where only the background design of the front cover differs from that of subsequent pages. In such a case, it is favorable to use the latter method (page subsequent to front cover is assumed to be "first page").

It should be understood by those skilled in the art that various modifications, combinations, sub-combinations and alterations may occur depending on design requirements and other factors insofar as they are within the scope of the appended claims or the equivalents thereof.

What is claimed is:

1. A non-transitory computer readable recording medium that records a program for causing a computer of an information processing apparatus to operate as:
   a control circuit that
      determines whether a rendering command of a document created using presentation software is a first-page rendering command,
      when determined as the first-page rendering command, caches the first-page rendering command, and
      generates first-page printable data based on the first-page rendering command and caches the first-page printable data, and
      when determined as a rendering command of one of second and subsequent pages,
      determines whether the rendering command of the one of second and subsequent pages and the cached first-page rendering command are in common in at least parts thereof, and
      describes, when determined that the rendering command of the one of second and subsequent pages and the cached first-page rendering command are in common in at least parts thereof, the common part in a form or macro command to generate printable data of the one of second and subsequent pages using the cached first-page printable data; and
   a communication interface that transmits the printable data generated by the control circuit to an image forming apparatus,
   wherein
   the control circuit further
      determines which of a first-page rendering command, a second-page rendering command, and a rendering command for one of third and subsequent pages the rendering command is, and
      when determined as the second-page rendering command and when the second-page rendering command and the cached first-page rendering command are in common in at least parts thereof,
      determines, when determined as the rendering command of the one of third and subsequent pages, whether the rendering command of the one of third and subsequent pages and the cached first-page rendering command are in common in at least parts thereof using a method different from that used for determining whether the second-page rendering command and the cached first-page rendering command are in common in at least parts thereof, and
   wherein
   the method includes determining, when determined as the rendering command of the one of third and subsequent pages, whether the rendering command of the one of third and subsequent pages and the common part of the second-page rendering command and the cached first-page rendering command are in common in at least parts thereof, to determine whether the rendering command of the one of third and subsequent pages and the cached first-page rendering command are in common in at least parts thereof.

2. The non-transitory computer readable recording medium according to claim 1, wherein
   the control circuit determines, when determined as the rendering command of the one of third and subsequent pages, whether a start and end of the rendering command of the one of third and subsequent pages and a start and end of the common part of the second-page rendering command and the cached first-page rendering command are in common, to determine whether the rendering command of the one of third and subsequent pages and the cached first-page rendering command are in common in at least parts thereof.

3. The non-transitory computer readable recording medium according to claim 1, wherein
   the control circuit intermittently determines, when determined as the rendering command of the one of third and subsequent pages, whether the rendering command of the one of third and subsequent pages and the common part of the second-page rendering command and the cached first-page rendering command are in common in at least parts thereof, to determine whether the rendering command of the one of third and subsequent pages and the cached first-page rendering command are in common in at least parts thereof.

4. The non-transitory computer readable recording medium according to claim 1, wherein
   the control circuit further determines whether a document related to the acquired rendering command is a document that has been created using presentation software.

5. An information processing apparatus, comprising:
   a control circuit that
      determines whether a rendering command of a document created using presentation software is a first-page rendering command, when determined as the first-page rendering command, caches the first-page rendering command, and generates first-page printable data based on the first-page rendering command and caches the first-page printable data, and when determined as a rendering command of one of second and subsequent pages, determines whether the rendering command of the one of second and subsequent pages and the cached first-page rendering command are in common in at least parts thereof, and describes, when determined that the rendering command of the one of second and subsequent pages and the cached first-page rendering command are in common in at least parts thereof, the common part in a form or macro command to generate printable data of the one of second and subsequent pages using the cached first-page printable data; and a communication interface that transmits the printable data generated by the control circuit to an image forming apparatus, wherein the control circuit further determines which of a first-page rendering command, a second-page rendering command, and a rendering command for one of third and subsequent pages the rendering command is, and when determined as the second-page rendering command and when the second-page rendering command and the cached first-page rendering command are in common in at least parts thereof, determines, when determined as the rendering command of the one of third and subsequent pages, whether the rendering command of the one of third and subsequent pages and the cached first-page rendering command are in common in at least parts thereof using a method different from that used for determining whether the second-page rendering command and the cached first-page rendering command are in common in at least parts thereof, and wherein the method includes determining, when determined as the rendering command of the one of third and subsequent pages, whether the rendering command of the one of third and subsequent pages and the common part of the second-page rendering command and the cached first-page rendering command are in common in at least parts thereof, to determine whether the rendering command of the one of third and subsequent pages and the cached first-page rendering command are in common in at least parts thereof.

* * * * *